US011342851B2

(12) United States Patent
Augesky

(10) Patent No.: US 11,342,851 B2
(45) Date of Patent: May 24, 2022

(54) MODULAR DC POWER SUPPLY WITH INDEPENDENT OUTPUT CONVERTERS

(71) Applicant: Siemens Aktiengesellschaft, Munich (DE)

(72) Inventor: Christian Augesky, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 879 days.

(21) Appl. No.: 14/376,887

(22) PCT Filed: Jan. 14, 2013

(86) PCT No.: PCT/EP2013/050573
§ 371 (c)(1),
(2) Date: Aug. 6, 2014

(87) PCT Pub. No.: WO2013/117385
PCT Pub. Date: Aug. 15, 2013

(65) Prior Publication Data
US 2015/0021996 A1    Jan. 22, 2015

(30) Foreign Application Priority Data
Feb. 6, 2012 (EP) .................................... 12153980

(51) Int. Cl.
*H02M 3/335* (2006.01)
*G05F 1/577* (2006.01)
(Continued)

(52) U.S. Cl.
CPC ........ *H02M 3/33561* (2013.01); *G05F 1/577* (2013.01); *H02M 3/1584* (2013.01);
(Continued)

(58) Field of Classification Search
CPC .. H02M 3/33561; H02M 3/1584; G05F 1/577
(Continued)

(56) References Cited

U.S. PATENT DOCUMENTS

| 6,523,128 | B1 * | 2/2003 | Stapleton | .............. | G06F 1/3203 |
| | | | | | 713/324 |
| 2005/0180065 | A1 * | 8/2005 | Chapuis | ................. | H02H 7/261 |
| | | | | | 361/18 |

(Continued)

FOREIGN PATENT DOCUMENTS

| CN | 1685299 | 10/2005 |
| CN | 1685583 | 10/2005 |

(Continued)

OTHER PUBLICATIONS

Office Action dated Jun. 13, 2018 issued in the corresponding India Patent Application No. 5495/DELNP/2014.

*Primary Examiner* — Daniel Cavallari
*Assistant Examiner* — Swarna N Chowdhuri
(74) *Attorney, Agent, or Firm* — Cozen O'Connor

(57) ABSTRACT

A power supply with a DC-DC converter and a switching converter comprises an intermediate circuit and at least one output switching regulator. The intermediate circuit has an intermediate circuit voltage, and is connected to a supply voltage via the DC-DC converter. The at least one output switching regulator is connected to the intermediate circuit, and configured to supply, on the output side, a regulated output voltage.

20 Claims, 2 Drawing Sheets

(51) Int. Cl.
*H02M 3/158* (2006.01)
*H02M 1/42* (2007.01)
*H02M 1/00* (2006.01)
*H02M 1/32* (2007.01)

(52) U.S. Cl.
CPC ........ *H02M 3/33523* (2013.01); *H02M 1/007* (2021.05); *H02M 1/008* (2021.05); *H02M 1/327* (2021.05); *H02M 1/4208* (2013.01); *Y02B 70/10* (2013.01)

(58) Field of Classification Search
USPC .......................................................... 307/31
See application file for complete search history.

(56) References Cited

U.S. PATENT DOCUMENTS

| | | | | |
|---|---|---|---|---|
| 2006/0082222 | A1* | 4/2006 | Pincu | H05K 7/1457 307/29 |
| 2008/0211304 | A1* | 9/2008 | Farrington | H02M 3/33592 307/31 |
| 2009/0129128 | A1* | 5/2009 | Hirahara | H02J 9/061 363/49 |
| 2009/0179487 | A1 | 7/2009 | Liu | |
| 2010/0181961 | A1* | 7/2010 | Novak | H02J 50/10 320/108 |
| 2011/0228566 | A1 | 9/2011 | Liang | |
| 2011/0234000 | A1* | 9/2011 | Yan | H02J 1/08 307/31 |
| 2011/0241637 | A1* | 10/2011 | Parker | H02M 1/4225 323/282 |
| 2013/0119962 | A1* | 5/2013 | Holmberg | H02J 1/00 323/304 |
| 2013/0335043 | A1* | 12/2013 | He | H02M 3/04 323/234 |
| 2014/0354245 | A1* | 12/2014 | Batikoff | H02M 7/217 323/205 |
| 2017/0133943 | A1* | 5/2017 | Garrity | H02M 7/44 |

FOREIGN PATENT DOCUMENTS

| | | | | |
|---|---|---|---|---|
| CN | 1690777 | | 11/2005 | |
| CN | 100435069 | | 11/2008 | |
| CN | 102122889 | | 7/2011 | |
| CN | 102144343 | | 8/2011 | |
| EP | 1261121 | A2 | 11/2002 | |
| EP | 2343794 | A2 | 7/2011 | |
| SE | WO 2010149205 | A1 * | 12/2010 | ............... G06F 1/32 |
| TW | 200632634 | | 9/2006 | |
| WO | WO 2005109154 | A2 | 11/2005 | |
| WO | WO 2010026549 | A2 | 3/2010 | |
| WO | WO 2010149205 | A1 | 12/2010 | |

* cited by examiner

MODULAR DC POWER SUPPLY WITH INDEPENDENT OUTPUT CONVERTERS

CROSS-REFERENCE TO RELATED APPLICATIONS

This is U.S. national stage of PCT Application No. PCT/EP2013/050573, filed on Jan. 14, 2013, which claims priority to European Patent Application No. EP 12153980.3, filed on Feb. 6, 2012, each of which is hereby incorporated herein in its entirety by reference.

FIELD OF INVENTION

The invention relates to a power supply with a DC-DC converter and a switching converter.

DESCRIPTION OF THE RELATED ART

Two-stage power supplies that are known in the art utilize the advantages of double converter designs. An input-side supply voltage is regulated to a largely constant intermediate circuit voltage in this connection. This occurs with a step-down switching regulator and/or a step-up switching regulator. A low-loss DC-DC converter with a fixed transmission ratio is connected to this intermediate circuit voltage. The first stage regulates the intermediate circuit voltage such that the desired output voltage is generated at the output side.

Electronic fuses are connected downstream of a standard power supply of this kind for applications which require a safeguarded output voltage. In the event of an overload, such fuses limit the current and in overload operation switch off after a given time in order to avoid damage to components owing to excessive heating.

Fuses of this kind are advantageous above all if the power supply provides a plurality of load paths. Disruption in a load path then possibly leads to this path being switched off without the other load paths also having to be switched off.

The advantages that an arrangement of this kind entails are opposed by several drawbacks. Firstly it is associated with increased device complexity with a corresponding space requirement in a switch cabinet. Added to this is the cabling complexity. A fundamental drawback of the known solution also lies in the addition power loss and in the limited period during which the power supply can be operated in overload operation with power limitation.

SUMMARY OF THE INVENTION

The invention is based on an object of disclosing an improvement compared to the prior art for a power supply of the type mentioned in the introduction. This object is achieved by the features of the claimed invention.

An intermediate circuit with an intermediate circuit voltage is provided such that the intermediate circuit can be connected to a supply voltage via the DC-DC converter and at least one output switching regulator is connected to the intermediate circuit. The output switching regulator supplies, on the output side, a regulated output voltage. Using this arrangement, it is not necessary to regulate the intermediate circuit voltage. Instead the intermediate circuit voltage is produced from the power supplied through DC-DC converters and the power taken from output switching regulators. The output switching regulator performs the regulation of the output voltage using the existing intermediate circuit voltage level.

In one embodiment, the DC-DC converter is controlled using a controller, and the controller is supplied with a measured value of the instantaneous intermediate circuit voltage to limit the intermediate circuit voltage to a predefined lower value and to a predefined upper value. The DC-DC converter is then controlled such that the intermediate circuit voltage is always kept in a range which is advantageous as an input-side operating voltage range for the output switching regulator connected downstream.

Furthermore, it is advantageous if the output switching regulator includes a current regulator which limits an output current to an adjustable maximum value. It is, therefore, easily possible to safeguard against overloads using output switching regulators. In the event of an overload, there is a permanent limiting of the current using output switching regulators without having to switch off. Furthermore, a device construction of this kind saves space in a switch cabinet with less cabling complexity compared to conventional safeguarding systems.

A further improvement is achieved by supplying a switch-off signal to the output switching regulator. The switch-off signal causes the output switching regulator to switch off with a time lag after a predefined output current limit value has been exceeded. This ensures that components inside the power supply are not destroyed as a result of an overload.

In one embodiment, the output switching regulator is connected to a timer which outputs the switch-off signal if a predefined output current limit value is exceeded for a predefined period. The timer begins to run as soon as the output current reaches the output current limit value. If the output current stays above the output current limit value during the specified period, then the relevant output of the power supply is switched off.

In one embodiment, a temperature sensor for detecting a critical temperature is provided. In this case, the switch-off signal is output if a predefined output current limit value is exceeded and if the critical temperature reaches a limit value. A detected temperature of a critical component and the output current are evaluated in this way using suitable control device/apparatus. As soon as the output current rises above the output current limit value it determines whether to switch off the relevant output based on the temperature of the critical component.

It is also advantageous to set the intermediate circuit voltage as extra-low voltage. In the European Economic Area, for example, a voltage of up to 60V is specified. Specification of an extra-low-voltage circuit firstly provides a high level of safety for operating personnel. Various components can by way of example be safely connected to the intermediate circuit or be disconnected therefrom. On the other hand, the extra-low voltage allows a wide selection of inexpensive components for implementing the output switching regulator. Off-the-shelf electronic components from the consumer electronics, telecommunications or automotive sectors, by way of example, can be used instead of technically complex and expensive power components. Such topology enables a virtually continuous construction using surface-mount device (SMD) technology, moreover, and cooling of the components can also be carried out with little effort.

For high overall efficiency, it is advantageous to construct the DC-DC converter as a resonant converter. A converter of this kind has particularly low switching losses.

With connection to a public grid, it is advantageous if what is known as a power factor correction (PFC) circuit is connected upstream of the DC-DC converter for connection to a supply network. Disruptive harmonic waves in the supply network are avoided in this way, in particular, in the case of connection to a single-phase network.

An advantage of the invention provides that at least two output switching regulators are connected to the intermediate circuit. A plurality of loads can then be supplied using one power supply, wherein each load is safeguarded using a separate output switching regulator. The parallel construction of a plurality of outputs means that the currents in the power supply device are distributed among a plurality of lines, so conduction losses are reduced especially in devices with 20/40 or more amperes. Furthermore, the outputs can be interconnected in parallel to supply higher loads. The limiting and switch-off function of the individual output switching regulators is achieved by reciprocal decoupling.

The use of inexpensive extra-low-voltage components means that even with a plurality of output switching regulators the overall device costs are not higher than in the case of conventional device solutions.

In one embodiment, at least two output switching regulators have a shared output voltage regulator. Advantageously, this occurs in applications with two loads which require the same supply voltage, or if the outputs are connected in parallel.

In one embodiment, advantageously, the output voltages of the individual output switching regulators can be adjusted independently of each other. Each output switching regulator has a separate output voltage regulator with different desired output voltages. Conduction losses, which occur between the power supply and a load, can therefore, be easily compensated.

A plurality of output switching regulators is advantageously controlled by a shared control unit. It is advantageous if the shared control unit has an interface for communication with a bus system to send reporting data and/or receive control data. This increases flexibility when the power supply is used.

The control unit is advantageously provided with an instantaneous loading of the DC-DC converter as a parameter, and the control unit controls the output switching regulator as a function of this parameter. If the DC-DC converter nudges its loading limit, the transmitted power of the output switching regulator is reduced using the control unit. This ensures the continuous supply of connected loads.

It is advantageous if a prioritization is provided for controlling the output switching regulators. In the event of imminent overloading of the DC-DC converter, firstly the output switching regulators to whose outputs uncritical loads are connected are reduced or switched off. Such loads, which are essential, by way of example, for the availability of an industrial system, continue to be supplied.

It is also advantageous if the power supply has a basic device with a housing, wherein the housing has contacts to which the intermediate circuit voltage is applied so an expansion module with at least one further output switching regulator can be connected to the basic device using these contacts. This measure also increases the possibilities when using the power supply.

It is further advantageous if the basic device includes a separate control unit, wherein the housing of the basic device is provided with an interface, through which a control unit of the expansion module can be connected to the control unit of the basic device. The controller in the basic device acts as a master, by way of example, for specifying desired values. Communication with external reporting and control devices also occurs at this master controller. In the expansion module, the control unit is provided for actual output voltage regulation.

A particularly low-loss overall concept provides that the respective output switching regulator is constructed as a step-down switching regulator.

In one embodiment, a method comprises specifying an upper value and a lower value for the intermediate circuit voltage to a controller for controlling the DC-DC converter. The method also includes specifying a desired output voltage value to a controller for controlling the output switching regulator. The intermediate circuit voltage is then kept through control of the DC-DC converter within the upper and lower limits, thereby establishing an advantageous operating voltage range for output switching regulators that are connected downstream.

It is also advantageous if an output current limit value is specified to the output switching regulator, and if in the case wherein an output current value is greater than the output current limit value, the output current is limited to this output current limit value. A load continues to be supplied with the maximum possible continuous power in this way. If, by way of example, due to particular operating conditions, a plurality of loads is active simultaneously, this does not lead to failure of the power supply.

In one embodiment, an excess current limit value is specified to the output switching regulator, and this is a multiple of the output current limit value. In one embodiment, before a limitation to the output current limit value in the event the excess current limit value is reached, the output current is limited to this excess current limit value until a critical temperature inside the power supply reaches a limit value or until a predefined period has elapsed. Some fuses require by way of example a release current which is a multiple of the nominal current (for example three times the nominal current). By permitting such an excess current for a short period (10-25 ms), it is possible to trip such fuses without damaging components of the power supply.

It is also advantageous if the output switching regulator is switched off anyway after a given period in limiting operation. The output current can then be limited to an output current limit value which would be too high for continuous operation. Limiting operation of this kind can be carried out for the predefined period, however, without components of the power supply incurring damage.

BRIEF DESCRIPTION OF THE DRAWINGS

The invention will be described below using examples and with reference to the accompanying figures, in which schematically.

DETAILED DESCRIPTION OF THE PRESENTLY PREFERRED EMBODIMENTS

Figure 1:
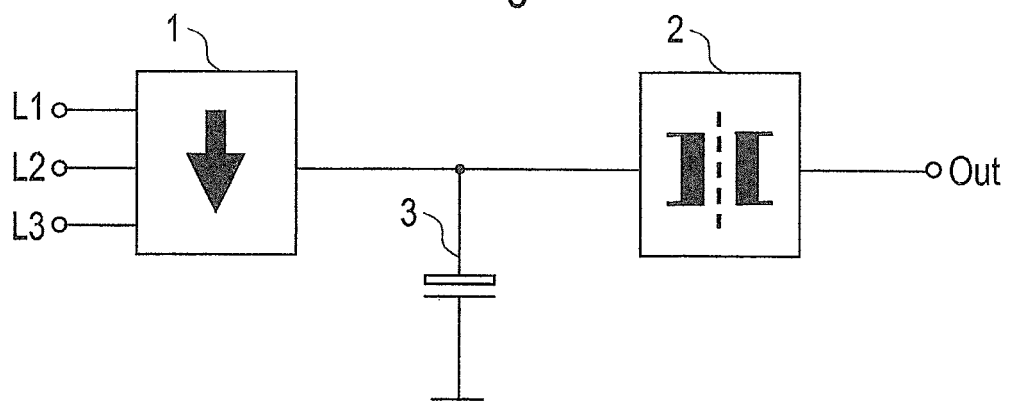
FIG. 1 shows a power supply according to the prior art.

A conventional power supply has a step-down switching regulator 1 which is connected, by way of example, to a three-phase supply network L1, L2, L3 (FIG. 1). An intermediate circuit 3 with an intermediate circuit resonator is provided at the output of the step-down switching regulator 1. A DC-DC converter 2 then converts an intermediate circuit voltage into an output voltage. The output voltage is regulated using step-down switching regulators 1 because the DC-DC converter 2 has a fixed transmission ratio. The intermediate circuit voltage is therefore fixed at a certain value which depends on the desired output voltage and transmission ratio of the DC-DC converter.

Figure 2:
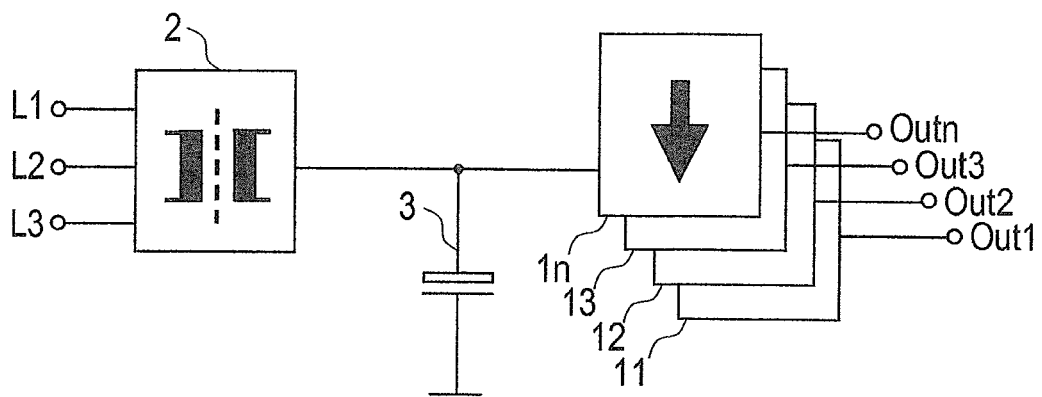
FIG. 2 shows a power supply with an inventive topology in accordance with one embodiment of the present invention.

By contrast, according to the invention, an intermediate circuit 3 without fixed intermediate circuit voltage is provided (FIG. 2). Applied to an intermediate circuit capacitor is a voltage which is produced from the power supplied at the input side and removed at the output side. At the input side, power is loaded from the supply network L1, L2, L3 into the intermediate circuit 3 using a DC-DC converter 2. Four output switching regulators 11, 12, 13, 1n, by way of example, are applied to the intermediate circuit 3, and these take power from the intermediate circuit 3 and pass it to connected loads. The DC-DC converter 2 is constructed, for example, as an LLC resonant converter.

Upper and lower limit values for the intermediate circuit voltage are optionally specified to a controller of the DC-DC converter 2 and it is also supplied with a measured value of the instantaneous intermediate circuit voltage. A voltage regulator of the intermediate circuit 3 then intervenes as soon as the intermediate circuit voltage reaches a limit value.

Each output switching regulator is advantageously constructed as a step-down switching regulator. Step-down switching regulators are highly efficient in particular if the level differences between input and output voltage differ only slightly, by way of example, by only a factor of two. With an output voltage conventional in the industrial sector of 24 volts, the intermediate circuit voltage advantageously ranges between 30 and 60 volts.

The topology allows independent adjustment of the voltage and the maximum current at each output. In the event of a disruption, each step-down switching regulator 11, 12, 13, 1n limits the current to the maximum value without the other outputs being affected thereby. The other load paths are continuously supplied despite a faulty load path.

Figure 3:
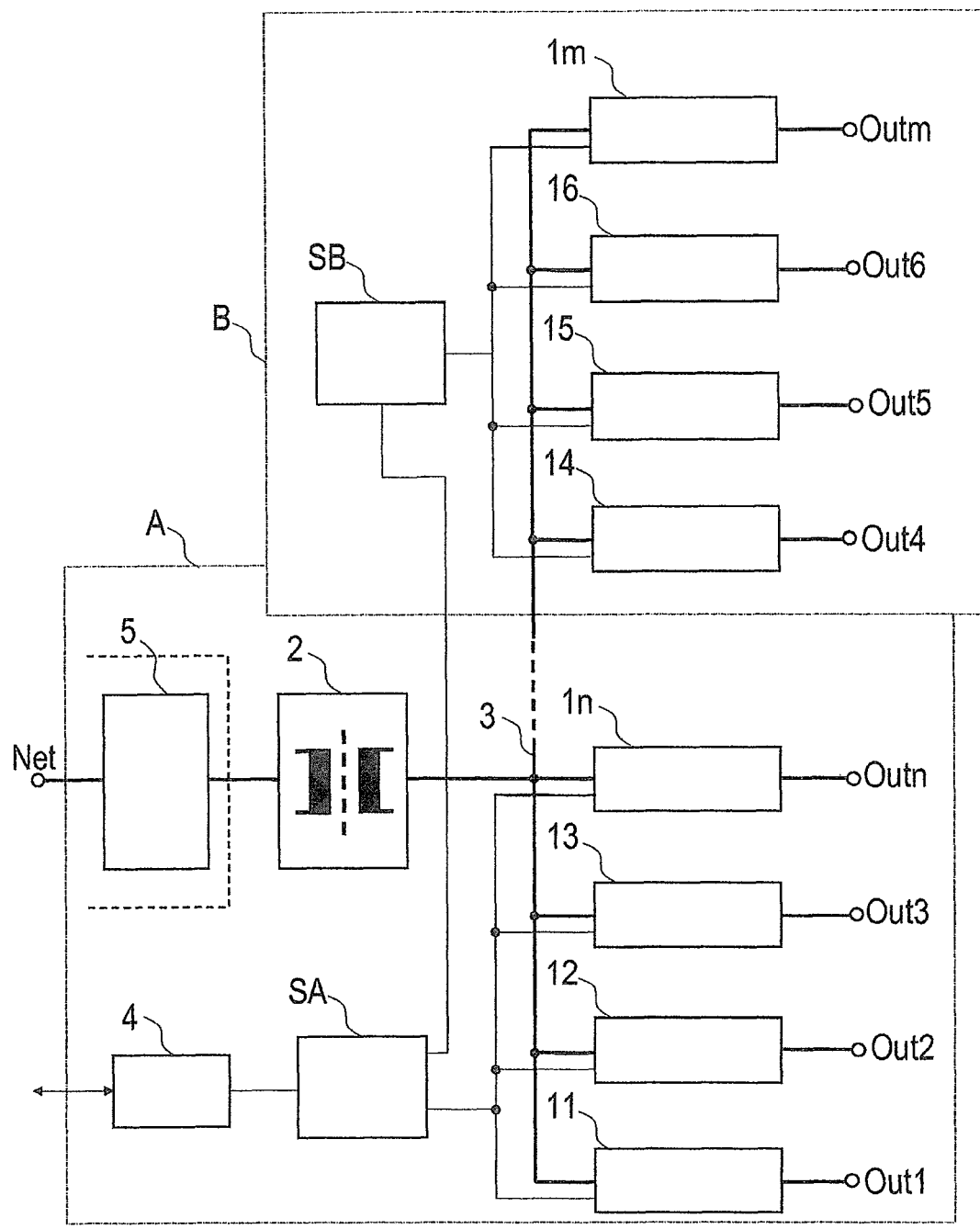
FIG. 3 shows a power supply with basic device and expansion module in accordance with one embodiment of the present invention.

In many applications, the situation can occur where the power removed from the supplied loads is enduringly lower than the available total output of the power supply. Different loads are connected to two outputs by way of example, and these are never active at the same time. The power that can be transferred from the DC-DC converter 2 can then be used by an expansion module B, as illustrated in FIG. 3.

A basic device A includes the DC-DC converter 2 which is connected for example by a power factor correction (PFC) circuit 5 to a single-phase supply network Net. At the output side, the DC-DC converter 2 is connected to four output switching regulators 11, 12, 13, 1n of the basic device A. The output switching regulators 11, 12, 13, 1n are controlled using a control unit SA which is set up as a master. This control unit SA is optionally connected by a suitable interface 4 to external components. A connection to a PROFINET, for example, is provided. Each output switching regulator 11, 12, 13, 1n supplies a regulated output voltage $Out_1$, $Out_2$, $Out_3$, $Out_n$ at its output.

The intermediate circuit 3 and the control unit SA have contacts to which the expansion module B is connected. The expansion module B includes four further output switching regulators 14, 15, 16, 1m which are connected to a shared controller SB. A regulated output voltage $Out_4$, $Out_5$, $Out_6$, $Out_m$ is applied to each output switching regulator 14, 15, 16, 1m.

The control unit SB of the expansion module B is set up as a slave and communicates with the control unit SA of the basic device A. The master control unit SA in the basic device A takes on load management. Scenarios for switching-off processes are provided by way of example if the sum of the power taken from the output switching regulators 11, 12, 13, 1n, 14, 15, 16, 1m exceeds the power of the DC-DC converter 2. In some embodiment, communication between the control unit SA of the basic device A and the control unit SB of an expansion module B can be omitted.

In some embodiments, the intermediate circuit 3 is connected to a further supply. For this purpose, either the intermediate circuit 3 is directly connected to a connectable power source, or a further DC-DC converter is arranged for connection to a further supply source, for example, in a separate connectable module. Connection to an additional supply does not pose a problem especially if the intermediate circuit voltage is designed as an extra-low voltage.

Although the present invention has been described above with reference to presently preferred embodiments, it is not limited thereto but rather can be modified in a wide variety of ways. In particular, the invention can be altered or modified in multifarious ways without departing from the essence of the invention.

The invention claimed is:

1. A power supply, comprising:
a DC-DC converter;
an intermediate circuit with an intermediate circuit voltage, the intermediate circuit being connected to a supply voltage via the DC-DC converter;
at least two output switching regulators connected to the intermediate circuit, each of said at least two output switching regulators supplying, on an output side, a respective regulated output voltage; and
a control unit shared by a plurality of the at least two output switching regulators, the control unit only controlling the at least two output switching regulators;
wherein as a parameter the control unit is supplied with an instantaneous load of the DC-DC converter;
wherein the control unit controls the at least two output switching regulators dependent on said parameter to prevent an overload of the DC-DC converter; and
wherein the at least two output switching regulators are deactivated based on a prioritization in an event of imminent overloading of the DC-DC converter and depending on respective connected loads to ensure continuous supply to essential output switching regulators and the respective connected loads.

2. The power supply of claim 1, wherein the DC-DC converter is controlled using a controller, and wherein the controller is supplied with a measured value of the instantaneous intermediate circuit voltage to limit the intermediate circuit voltage to a predefined lower value and to a predefined upper value.

3. The power supply of claim 1, wherein the at least two output switching regulators include a respective current regulator which limits an output current to an adjustable maximum value.

4. The power supply of claim 1, wherein the at least two output switching regulators are supplied with a switch-off signal that causes the at least two output switching regulators to switch off with a time lag after a predefined output current limit value has been exceeded.

5. The power supply of claim 4, wherein the at least two output switching regulators are connected to a timer which outputs the switch-off signal if a predefined output current limit value is exceeded for a predefined period.

6. The power supply of claim 4, further comprising:
a temperature sensor for detecting a critical temperature;
wherein the switch-off signal is output if a predefined output current limit value is exceeded and if the critical temperature reaches a limit value.

7. The power supply of claim 1, wherein the intermediate circuit voltage is set as a reduced voltage.

8. The power supply of claim 1, wherein the DC-DC converter is constructed as a resonant converter.

9. The power supply of claim 1, wherein a power factor correction circuit is connected upstream of the DC-DC converter for connection to a supply network.

10. The power supply of claim 1, wherein the at least two output switching regulators are connected to the intermediate circuit.

11. The power supply of claim 10, wherein the at least two output switching regulators have one of a shared output voltage regulation and a separate voltage regulation.

12. The power supply of 33, wherein each of the at least two output switching regulators has a separate output voltage regulation with different desired output voltages.

13. The power supply of claim 1, wherein the control unit shared by a plurality of the at least two output switching regulators includes an interface for communication with a bus system to send reporting data and/or receive control data.

14. The power supply of claim 1, further comprising:
a basic device with a housing;
wherein the housing includes contacts to which the intermediate circuit voltage is applied such that an expansion module with at least one further output switching regulator is connectable to the basic device via said contacts.

15. The power supply of claim 14, wherein the basic device further includes a separate control unit; wherein an interface is provided on the housing of the basic device.

16. The power supply of claim 1, wherein each of the at least two output switching regulator is constructed as a step-down switching regulator.

17. A method for operating a power supply of claim 1, comprising:
specifying an upper value and a lower value for the intermediate circuit voltage to a controller for controlling the DC-DC converter; and
specifying a desired output voltage value to a controller for controlling the at least one output switching regulator.

18. The method of claim 17, wherein an output current limit value is specified to the at least one output switching regulator, and wherein, in the case of an output current value greater than the output current limit value, the output current is limited to this maximum output current limit value.

19. The method of claim 17, wherein an excess current limit value is specified to the at least one output switching regulator, wherein the excess current limit value is a multiple of the output current limit value, and wherein, before a limitation to the output current limit value in an event the excess current limit value is reached, the output current is limited to the excess current limit value until a critical temperature inside the power supply reaches a limit value or until a predefined period has elapsed.

20. The method of claim 18, wherein the at least two output switching regulators are switched off after a given period in limiting operation.

* * * * *